United States Patent [19]
Volk

[11] 3,713,416
[45] Jan. 30, 1973

[54] DISPOSABLE THERMOMETER STRUCTURE

[76] Inventor: Anthony J. Volk, 173 East Syracuse St., Turlock, Calif. 95380

[22] Filed: April 3, 1972

[21] Appl. No.: 240,365

Related U.S. Application Data

[63] Continuation-in-part of Ser. No. 122,604, March 1, 1971.

[52] U.S. Cl. ................................ 116/114.5, 73/358
[51] Int. Cl. ............................................. G01k 11/06
[58] Field of Search ..73/358; 116/114.5; 99/192 TT; 337/408, 409, 148; 340/219

[56] References Cited

UNITED STATES PATENTS

| 3,090,235 | 5/1963 | Houser | 73/358 |
| 3,548,780 | 12/1970 | Kliewer | 73/358 |

*Primary Examiner*—Louis R. Prince
*Assistant Examiner*—Denis E. Corr
*Attorney*—Alvin E. Hendricson et al.

[57] ABSTRACT

A simple thermometer structure having an indicating rod adapted to extend therefrom and to move inwardly of a tubular housing with increasing temperature. The thermometer is set for operation by an internal latching arrangement operable by manual withdrawal of the indicating rod from the housing at the time of use of the thermometer.

4 Claims, 5 Drawing Figures

PATENTED JAN 30 1973 3,713,416

DISPOSABLE THERMOMETER STRUCTURE

This is a continuation-in-part of my prior copending U.S. patent application Ser. No. 122,604 filed Mar. 1, 1972 for "Disposable Cooking Thermometer."

BACKGROUND OF INVENTION

There have been developed a variety of different disposable cooking thermometers primarily designed for use with meat or fowl and intended to be inserted in the meat or fowl prior to sale to the consumer. Such thermometers are intended for but a single use and normally incorporate some type of physically movable element and temperature sensing means cooperating therewith such that a variable visually observable portion of the element is indicative of the temperature of the thermometer.

Disposable cooking thermometers may, for example, be inserted in turkeys, roasts, or the like, prior to freezing and shipping of same for retail sales. The disposable thermometer of my above-noted copending patent application has proven highly successful in this respect as well as with fresh meat and fowl and the present invention is particularly directed to an improvement thereon. This prior thermometer has the indicating rod so formed that it is adapted to be bent over and latched to the top of the tubular housing when the thermometer is originally inserted in the fowl or meat. Although this structure is highly satisfactory in operation, it does require the physical latching of the indicator rod at the time of manufacture or insertion and this involves a certain amount of time and expense.

It will be appreciated that disposable cooking thermometers of the type herein contemplated must be quite inexpensive inasmuch as they actually comprise a throw-away item. Any additional cost in manufacture or insertion of thermometers of this type is to be avoided.

The present invention incorporates an internal latching arrangement whereby the indicator rod is retained substantially entirely within the housing until the thermometer is actually to be used. The user then manually latches or sets the thermometer to extend the indicator rod therefrom so that during cooking of a turkey, for example, the rod slowly moves inwardly of the housing to indicate the degree of cooling of the turkey. This then reduces the cost of a disposable cooking thermometer of this type and simplifies the storage and transportation of a frozen food containing disposable thermometers.

SUMMARY OF INVENTION

The thermometer of the present invention comprises a tubular housing preferably having a closed pointed end for insertion into meat, fowl, or the like, with an indicating rod slidably engaging the housing for extension from the outer end thereof. Within the housing a spring urges the indicator rod inwardly of the housing to press the inner rod end against a fusable metal disposed in a longitudinal bore in the forward end of the housing. The inner end of the rod is dimensioned to slide into the bore and as the metal softens within increasing temperature, the indicator rod is then urged further into the housing so that the extent of the indicator rod outside the housing is an indication of the temperature of the thermometer. To this extent the present invention is the same as the invention of my above-noted copending patent application.

The present invention provides a latching structure internally of the thermometer housing with the indicator rod being divided into two parts; the upper or outer portion of the rod fitting into the adjacent end of the inner portion of the rod under normal inoperative condition. In order to set the thermometer for operation, the exposed end of the indicator rod is drawn outwardly of the housing to compress the spring in the housing and to lock the two portions of the rod together in extended position. More specifically, the present invention provides in the latching structure noted above an axial bore in the end of the inner portion of the rod. The outer portion of the rod has a pivotably mounted latch at the inner end thereof which is originally pivoted to lie alongside the rod as both are inserted in the bore in the inner rod portion. A spring is disposed about the upper portion of the rod and is retained in the housing to initially extend into the above-noted bore. As the outer portion of the rod is manually withdrawn from the housing, the spring is compressed and, as the pivot latch emerges from the bore in the inner portion of the rod, the latch is pivoted by the spring to extend laterally of the outer portion of the rod across the bore so that the outer portion of the rod can no longer enter the bore. In this position the two portions of the indicator rod are extended to full rod length with the outer portion of the rod then extending a predetermined distance from the housing. A flexible loop on the indicator rod exteriorly of the housing provides ready gripping means for withdrawing the rod from the housing to set or latch the thermometer and preferably the housing itself has lateral extensions so that an operator may press against same as he withdraws the rod from the housing.

DESCRIPTION OF FIGURES

The present invention is illustrated in the accompanying drawing wherein.

DESCRIPTION OF PREFERRED EMBODIMENT

Figure 2:
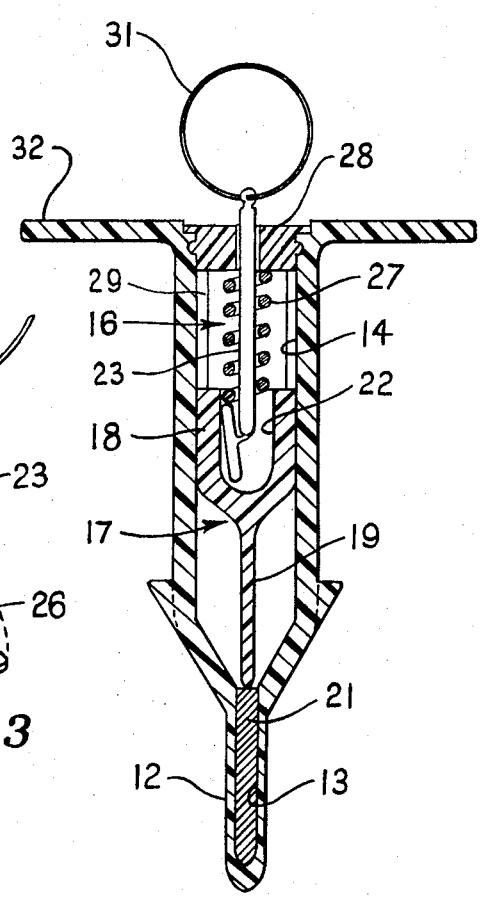
FIG. 2 is a central longitudinal sectional view of the thermometer of FIG. 1 in uncocked or unlatched position.

Considering now a preferred embodiment of the present invention and referring to the drawing, there will be seen to be illustrated a thermometer having a small elongated tubular housing 11 which preferably tapers inwardly at one end thereof to a small cylindrical axial tension or tip 12 which is closed at the outer end thereof. Within this tip 12 there is provided a small axial bore 13 extending from the interior of the housing short of the outer end of the tip 12, as illustrated in FIG. 2, for example.

The housing defines an internal cylindrical opening 14 extending from the back of the housing to the front where the small bore 13 commences and within this opening 14 there is slidably disposed two-part indicator rod 16. The innermost portion of this rod may be denominated as a slide 17 having an upper portion 18 slidably engaging the interior walls of the housing and a depending axial extension 19 of reduced diameter adapted to fit within the housing bore 13. This axial extension 19 of the slide element 17 is formed with longitudinal grooves about same to provide a predetermined cross sectional area for flow of softened temperature sensing metal, as further described below. Within the housing bore 13 there is provided a material 21 that becomes plastic or liquid at a predetermined temperature. This material may, for example, be comprised as Cerro metal or any of a variety of metal alloys including, for example, Wood's metal, bismuth, tin, and the like. The material 21 has a predetermined softening temperature and thus, as this temperature is approached and reached, the extension 19 is forced into the bore 13 to press the metal 21 therein up and out of the bore about this extension 19.

Figure 3:
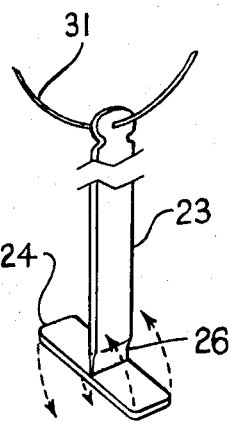
FIG. 3 is a perspective view of the upper portion of an indicating rod as may be employed in the thermometer of this invention.

The upper and lower portions of the indicator rod 16 are adapted to telescope and to this end there is provided an axial bore 22 in the upper end of the slide member 17. The upper rod portion 23 may be cylindrical or may be formed as a flat bar, as indicated in FIG. 3. At the bottom of this upper rod 23 there is provided a pivotally mounted latch 24. In practice the rod 23 and latch 24 may be formed as a single piece of lightweight plastic having a limited flexibility with the connection of rod and latch merely comprising a necked-down or very thin portion of the rod, as illustrated at 26 of FIG. 3. This then provides a flexibility of connection, such that the plate-like latch element 24 may pivot at the connection, as indicated by the arrows in FIG. 3. This latch element 24 will thus be seen to have an illustrated position extending laterally of the rod 23 at the bottom end thereof or a pivoted position wherein the latch is aligned with the rod lying along a side thereof at the inner end of the rod. In this second latch position the rod and latch are dimensioned to fit within the end depression 22 of the slide member 17, as illustrated in FIG. 2. Other latch connection is possible; however, the one described is quite simple, inexpensive and effective.

There is provided a compression spring 27 about the rod 23. A collar 28 closes the outer end of the housing opening 14 and may be provided with an annual ring to snap into a groove in the housing for retaining the collar in position. The collar 28 has an axial slot therethrough for extension of the upper rod 23, as illustrated in FIG. 2, and the spring 27 bears against the underside of the collar 28 to retain the spring within the housing.

In the normal or storage position of the thermometer hereof, the inner end of the rod 23 and the latch 24 are inserted in the bore 22 in the end of the slide member 17, as illustrated in FIG. 2. The spring 27 is disposed about the rod 23 beneath the collar 28 and may also extend into the bore 22, again as illustrated in FIG. 2. It is provided by the present invention that the thermometer hereof shall be set or latched by drawing the rod 23 outwardly of the housing 11 and to this end there is provided means for gripping the outer end of the rod 23. This gripping means 31 may be provided as a flexible loop of plastic thread or the like connected to the outer end of the rod 23 or possibly some type of insignia cap or the like connected to the rod. By this means a user of the thermometer may grip the loop or the like 31 and pull the rod 23 outwardly of the housing to compress the spring 27 against the collar 28.

Provision is also made for preventing the slide member 17 from moving outward of the housing with the rod 23 and means to this end may, for example, comprise a longitudinal extension 29 on the collar 28 extending along a side of the housing opening 14 to engage the upper end of the slide member 17. With the rod 23 having a rectangular configuration, as illustrated, and the latch member 24 pivoting against the broad side thereof, this collar extension 29 is disposed on the side of the collar adjacent the narrow side of the axial slot through the collar in order to be disposed alongside the latch 24. This then prevents any possible engagement of latch plate 24 and collar extension 29 which might conceivably prevent the latch from fully swinging into perpendicular relationship with the rod 23. Because of the very minute dimensions of the interior elements of the present invention, care must be taken to ensure clearance for the latch plate 24.

Under the circumstances wherein a cylindrical rod 23 is employed, alternative provision for preventing the slide member 17 from moving upwardly in the housing is preferably employed. Such mens might, for example, comprise a small lateral extension or ring on the lower part of the upper portion 18 of the slide member which would be slipped over a small inner protuberance of the housing extending into the opening 14 therein so that the slide member would be free to move inwardly of the housing but not outwardly thereof. It will be appreciated that a variety of different means may be employed in connection with maintaining the slide member 17 in position during latching of the thermometer hereof.

Figure 1:
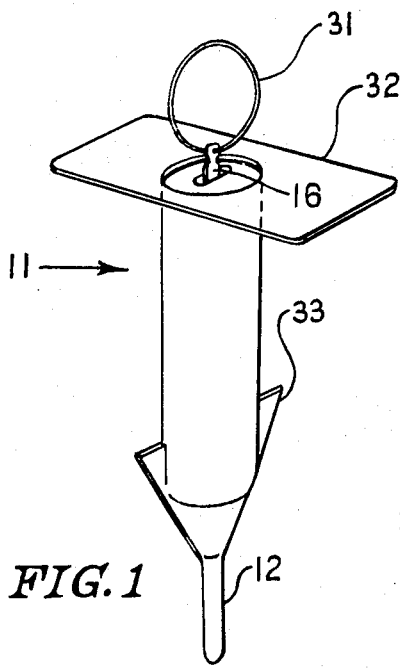
FIG. 1 is a perspective view of a disposable cooking thermometer in accordance with the present invention.

The thermometer housing 11 may be additionally provided with a laterally extending flange 32 about the outer end of the housing to serve as a purchase when latching the thermometer. Additionally, the housing is provided with laterally extending barbs or the like 33, as illustrated in FIG. 1, for the purpose of securing the housing in inserted position in meat, fowl, or the like.

Figure 4:
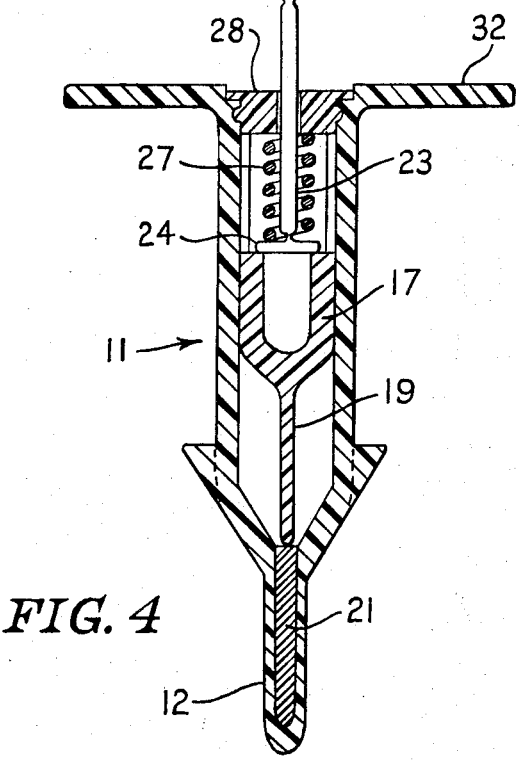
FIG. 4 is a sectional view in the same plane as FIG. 2 and illustrating the thermometer in latched or set position ready for indicating the temperature of meat, fowl or the like, in which the thermometer may be disposed.
Figure 5:
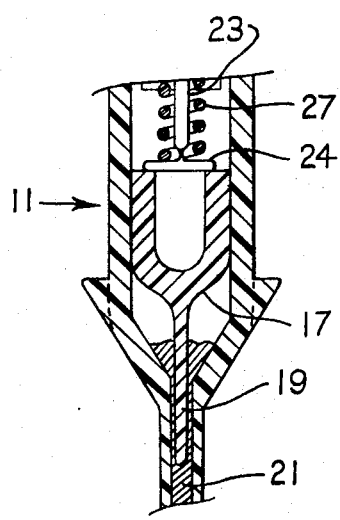
FIG. 5 is a sectional view illustrating the relative position of elements at an intermediate temperature being indicated by the thermometer.

Considering now operation of the present invention, it is first noted that the illustration of FIG. 2 shows the thermometer in normal or unactuated position with the indicator rod substantially entirely within the housing. It is noted that in this illustration the loop 31 is shown extending upwardly from the end of the indicator rod for clarity of illustration but, in practice, this loop would normally lie flat on the flange 32. This then provides the present thermometer with a sufficiently flat outer or end surface that it does not provide any problem to the packaging of meat, fowl, or the lie, when the thermometer is inserted in same. In order to set or latch the present thermometer in condition for use, a housewife, for example, merely draws the upper portion 23 of the indicator rod out of the housing by slipping a finger through the loop 31 and pulling. The flange 32 provides a purchase so that other fingers or thumb of the hand may be placed thereagainst while pulling the loop 31. As the upper rod portion 23 is withdrawn from the housing, the inner end of the rod 23 with the latch 24 thereon moves out of the axial bore 22 in the lower portion 17 of the rod. This compresses the spring 27 and, as the rod 23 clears the end of the member 17, the spring bearing on the latch 24 pivots the latch into the position illustrated in FIGS. 3 and 4. As will be seen in FIG. 4 the length of the latch element 24 is greater than the diameter or cross sectional dimension of the bore 22 in the element 17 and thus, with the latch pivoted to extend laterally across the inner end of the rod 23, this rod can no longer enter the bore 22. This condition is illustrated in FIG. 4 wherein the thermometer may be considered as set or latched with the two portions of the indicator rod extending full length so as to extend the outer portion of the rod a prescribed distance from the outer end of the housing. In this condition the spring 27 is compressed to urge the slide member 17 inwardly of the housing and thus to press the end of the axial extension 19 of this element into the metal 21. As the temperature of the thermometer approaches and reaches the softening temperature of the metal 21, this axial extension 19 will then be forced into the metal so as to move into the bore 13 while the metal is squeezed about this extension and up into the large housing opening 14, as illustrated in FIG. 5.

It will be seen that the present invention, as described above, provides an improved disposable thermometer structure. The degree of cooking of meat, fowl, or the like, in which the present invention may be inserted, is accomplished in the same manner as the thermometer of my above-noted copending patent application. The present invention does, however, advantageously provide an improved structure wherein the indicator rod of the thermometer is normally maintained substantially within the housing thereof. This simplifies the assembly of the thermometers to therefore effect a reduction in cost of manufacture and furthermore provide certain advantages in the use of the thermometer.

It is not intended to limit the present invention to the details of description or illustration, for it will be apparent to those skilled in the art that various modifications may be made within the scope of this invention.

What is claimed is:

1. In a disposable cooking thermometer having an elongated hollow housing with resilient means for urging an indicator rod inwardly of the housing against a thermally plastic material, the improvement comprising said indicator rod being formed of separate upper and lower axially aligned sections with a first section fitting partially within an axial depression in the other section in a first retracted position and latching means holding said sections substantially apart against the force of said resilient means in a second extended position.

2. The thermometer of claim 1 further defined by the first section of said indicator rod having an outer end thereof extending from said housing, said resilient means comprising a compression spring about the first section of said indicator rod, and said latch comprising a plate pivotally connected to an inner end of the first section of said indicator rod for insertion in the depression in the second section of said indicator rod and having a sufficient length to bridge said depression under the urging of said spring in said extended position of the indicating rod.

3. The thermometer of claim 2 further defined by at least the first section of said indicator rod being formed of limitedly flexible plastic material and said latch being integral therewith and said pivotal connection being a reduced cross section of this same material.

4. A disposable cooking thermometer comprising a hollow tubular housing having a small axial bore internally of an inner end thereof, a solid thermoplastic material disposed in said housing bore with such material having the property of melting at a predetermined temperature, a slide member having an axial bore in an outer end thereof disposed in said housing and having an axial extension bearing on said thermoplastic material with said extension being adapted to slidably fit said bore of said housing with a predetermined clearance, collar means closing an outer end of said housing, an indicator rod disposed axially of said housing through said collar means and disposed substantially entirely within the housing, a spring disposed between said collar means and slide member about said indicator rod, and latch means pivotally mounted on an inner end of said indicator rod for insertion into the axial bore of said slide member in a normal position of the rod and pivotal by compression of said spring for disposition across said bore upon retraction of the rod from the housing into an operating position of the rod with such rod extension from the housing.

* * * * *